(12) United States Patent  
Chizgi et al.

(10) Patent No.: US 9,112,672 B2  
(45) Date of Patent: Aug. 18, 2015

(54) APPARATUS AND METHOD FOR EARLY DECODING OF TFCI IN UMTS

(71) Applicant: QUALCOMM Incorporated, San Diego, CA (US)

(72) Inventors: Nate Chizgi, Sunnyvale, CA (US); Prashant Udupa Sripathi, San Jose, CA (US); Valibabu Saladi, San Diego, CA (US); Sharif A. Matin, San Diego, CA (US); Yi Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 92 days.

(21) Appl. No.: 14/063,802

(22) Filed: Oct. 25, 2013

(65) Prior Publication Data

US 2014/0169273 A1    Jun. 19, 2014

Related U.S. Application Data

(60) Provisional application No. 61/738,115, filed on Dec. 17, 2012.

(51) Int. Cl.  
*H04Q 7/00* (2006.01)  
*H04L 1/00* (2006.01)

(52) U.S. Cl.  
CPC .................................. *H04L 1/0091* (2013.01)

(58) Field of Classification Search  
None  
See application file for complete search history.

(56) References Cited

U.S. PATENT DOCUMENTS

| 8,456,996 | B2 | 6/2013 | Bhattacharjee et al. | |
|---|---|---|---|---|
| 2003/0072290 | A1* | 4/2003 | Hwang et al. | 370/342 |
| 2005/0018614 | A1* | 1/2005 | Kiran | 370/252 |
| 2012/0263150 | A1 | 10/2012 | Sun et al. | |
| 2012/0281675 | A1 | 11/2012 | Liang et al. | |
| 2013/0121179 | A1 | 5/2013 | Dang et al. | |
| 2013/0148579 | A1 | 6/2013 | Das et al. | |

* cited by examiner

*Primary Examiner* — Duc C Ho  
(74) *Attorney, Agent, or Firm* — Arent Fox LLP (57) ABSTRACT

Disclosed are systems, methods, and computer program products for decoding of transport format combination indicator (TFCI) in a universal mobile telecommunications system (UMTS). In one aspect, a method includes receiving by a UE coded TFCI bit sequence on a physical channel, determining a range of TFCI bits that contain information, performing early decoding of the received TFCI bit sequence; and limiting the search set of decoded TFCI bits to the determined range of TFCI bits. The range of TFCI bits that contain information may be determined from a code book.

24 Claims, 7 Drawing Sheets

APPARATUS AND METHOD FOR EARLY DECODING OF TFCI IN UMTS

CLAIM OF PRIORITY UNDER 35 U.S.C. §119

The present Application for Patent claims priority to Provisional Application No. 61/738,115 filed on Dec. 17, 2012, and assigned to the assignee hereof and hereby expressly incorporated by reference herein.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Downlink Packet Access (HSDPA) is a data service offered on the downlink of WCDMA networks.

UMTS-based systems use various physical channels, such as a Dedicated Physical Channel (DPCH) or a Secondary Common Control Physical Channel (SCCPCH) to transport various service-related information to UEs, such as pilot signals used for channel synchronization between the base station and UEs, transmit power control (TPC) commands used by UEs to adjust its transmitter power, feedback information (FBI) used for closed loop transmission diversity, and transport format combination indicator (TFCI) that contains information about data rates, spreading factors, and other information used by UEs to decode a dedicated control channel (DCCH) and dedicated data channel (DDCH). Early and reliable decoding of the TFCI is highly desirable because it translates directly to overall DPCH BLER, and incorrect decoding of the TFCI may lead to incorrect decoding and demodulation of the DCCH and DDCH.

SUMMARY

The following presents a simplified summary of one or more aspects of mechanisms for performing early decoding of TFCI. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In one aspect, a method for early decoding of TFCI in UMTS includes receiving coded TFCI bit sequence on a physical channel, determining a range of TFCI bits that contain information, performing early decoding of the received TFCI bit sequence, and limiting the search set of decoded TFCI bits to the determined range of TFCI bits.

In one aspect, the range of TFCI bits that contain information may be determined from a code book.

In another aspect, the range of TFCI bits that contain information is determined based on one of a communication protocol used on the physical channel, a data encoding scheme used on the physical channel, and call types including different numbers of transport channels.

In another aspect, early decoding of the TFCI bit sequence includes performing Fast Hadamard Transform (FHT) on the coded TFCI bit sequence.

In another aspect, the method further includes determining whether the TFCI bit sequence is correctly decoded and, when the TFCI bit sequence is correctly decoded, performing early decoding of the physical channel.

In another example aspect, the method further includes determining whether the TFCI bit sequence is correctly decoded and, when the TFCI bit sequence is correctly decoded, entering a low power mode by a user equipment without decoding the physical channel.

In one example aspect, the physical channel includes one of a dedicated physical channel (DPCH) or a Secondary Common Control Physical Channel (SCCPCH).

In one example aspect, an apparatus for early decoding of TFCI in UMTS includes at least one processor configured to receive coded TFCI bit sequence on a physical channel, determine a range of TFCI bits that contain information, perform early decoding of the received TFCI bit sequence, and limit a search set of decoded TFCI bits to the determined range of TFCI bits.

In one aspect, a method for early decoding of TFCI in UMTS includes receiving coded TFCI bit sequence on a physical channel, performing early decoding of the received TFCI bit sequence, sorting the decoded TFCI bit sequences based on strength of the decoded TFCI bit sequence, and selecting one or more strongest TFCI bit sequences as early decoded TFCI candidates.

In one example aspect, an apparatus for early decoding of TFCI in UMTS includes at least one processor configured to receive coded TFCI bit sequence on a physical channel, perform early decoding of the received TFCI bit sequence, sort the decoded TFCI bit sequences based on strength of the decoded TFCI bit sequence, and select one or more strongest TFCI bit sequences as early decoded TFCI candidates.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
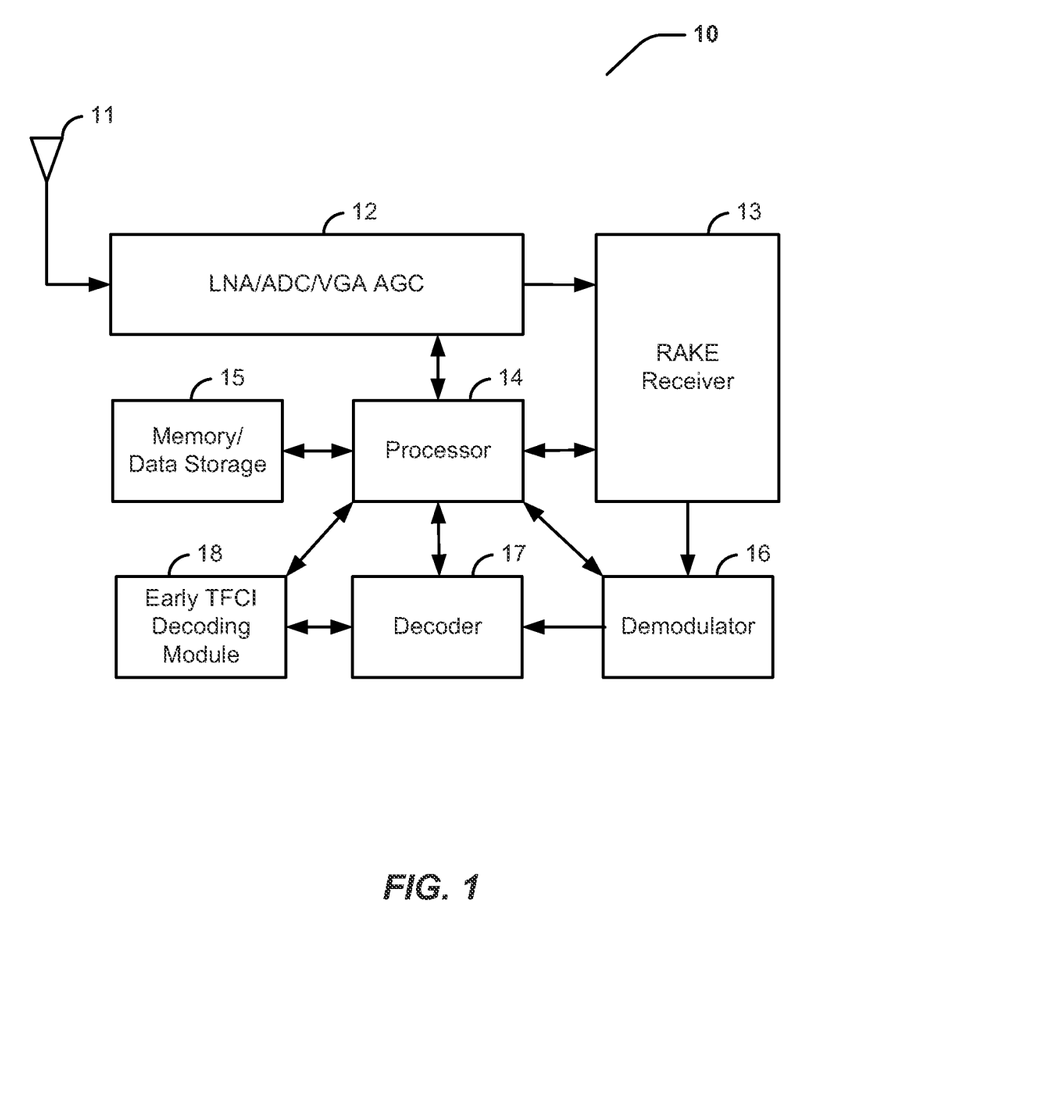
FIG. 1 illustrates one example implementation of a WCDMA UMTS receiver.

FIG. 1 illustrates an example configuration of a WCDMA receiver used in UMTS communication system. Receiver 10 includes a RF antenna 11 that receives RF signals, such as WCDMA voice or data packets and pilot signals, from a base station and transforms them into electric signals. The signals are transmitted to amplifier circuit 12, which may include a low noise amplifier (LNA), analog-to-digital converter (ADC), variable gain amplifier (VGA) and automatic gain control (AGC) circuit, which calibrates operating range of the LNA, ADC and VGA. The amplified and digitized signals are then passed to a Rake receiver 13, which is mitigates effects of multipath fading. The resulting signal is then demodulated by a demodulator 16, such as a QPSK demodulator and decoded by decoder 17, such as Viterbi decoder, which performs decoding of convolutionally encoded data used in WCDMA transmissions. The receiver 10 also includes a processor 14, such as a microprocessor or microcontroller, which executes programs for controlling operation of the components of the receiver 10, and memory 15 that stores runtime data and programs executed by the processor 14.

As explained above, UMTS communication systems use a Dedicated Physical Channel (DPCH) or a Secondary Common Control Physical Channel (SCCPCH) to transport various service-related information to UEs, such as pilot signals used for channel synchronization between the base station and UEs, transmit power control (TPC) commands used by UEs to adjust its transmitter power, feedback information (FBI) used for closed loop transmission diversity, and transport format combination indicator (TFCI) that contains information about data rates, spreading factors, and other information used by UEs to decode a dedicated control channel (DCCH) and dedicated data channel (DDCH). Early and reliable decoding of the TFCI is highly desirable because it translates directly to overall DPCH BLER, and incorrect decoding of the TFCI may lead to incorrect decoding and demodulation of the DCCH and DDCH. To that end, UE 10 may include an early TFCI decoding module 18 that performs early decoding of TFCI for each transmission time interval (TTI) of DPCH.

According to 3GPP 25.212, the TFCI is a 10-bit value which is encoded by the transmitter into 30 bits (32 bits with 2 bits punctured) and all 30 bits are transmitted within each 10 ms TTI, e.g., 2 bits per slot of the 15-slot frame. Due to the coding, it is possible to decode TFCI earlier than the 10 ms boundary, e.g., at 6 ms boundary, 8 ms boundary, or even at an earlier TTI boundary. Thus, as used herein, the term "early decoding" refers to decoding of the TFCI anytime before the 10 ms TTI boundary of the DPCH or SCCPCH. Essentially decoding of the TFCI involves performing a 32-point Fast Hadamard Transform (FHT) and finding the maximum value among the real TFCI vectors going up to 128 among the following possible outputs of the FHT processing (assuming never more than 7-bit TFCI required):

$$\begin{bmatrix} FHT_{32}(\text{Permuted } TFCI \text{ Symbols}) \\ -FHT_{32}(\text{Permuted } TFCI \text{ Symbols}) \\ FHT_{32}(\text{Basis6} \cdot * \text{Permuted } TFCI \text{ Symbols}) \\ -FHT_{32}(\text{Basis6} \cdot * \text{Permuted } TFCI \text{ Symbols}) \end{bmatrix}$$

Early decoding, however, decreases reliability of the decoded data bits, and mechanisms for improving reliability of the early decoded TFCI bits are necessary.

In one aspect, one possible approach for improving early TFCI decode reliability is to restrict the possible outputs of the FHT processing to only the TFCI values that are possible to exist for a particular communication protocol used on the DPCH, call types including different numbers of transport channels and/or data encoding scheme used by the base station and the UE. For example, a commonly used Adaptive Multi-Rate Narrowband (AMR-NB) audio compression scheme used in UMTS communications typically has only 6 valid TFCI combinations to cover all possible AMR-NB packet types:

1. NULL
2. SID
3. FULL
4. NULL+DCCH
5. SID+DCCH
6. FULL+DCCH

In this example, restricting the TFCI search space to just the 6 above options in the TFCI code-book can substantially improve reliability of decoding of the TFCI by eliminating 122 of the 128 possible TFCI decoding results. Thus, in the example of AMR-NB coding scheme, early TFCI decoder module only need to decode the equivalent of 3 bits ($2^3=8$, which includes 6 valid TFCI bits) of the coded 30-bit TFCI sequence. Also, by restricting the TFCIs within the permissible transport format combination set (TFCS), the possibility of an overhead CRC error occurring for all existing transport channels in case a TFCI decode error is substantially reduced. Instead in this case, the traffic transport channels will still have better chance to run CRC based on likelihood TFCI.

In another aspect, another possible approach for improving early TFCI decode reliability is to take into account a soft TFCI metric to sort the TFCI decode vectors in order of likelihood. In this case, several implementations are possible:

In one aspect, the top N likely TFCI decode vectors can be tried in the decoder. This can be conditioned on the strength of the winning TFCI decode vector relative to non-winning TFCI decode vectors within the TFCI code book. Particularly, since TFCI is transmitted every 10 ms and repeated for the length of the minimum DCH TTI, attempting decode of multiple TFCI in the first frame of the minimum length TTI can enhance the likelihood of getting a matching TFCI in the subsequent frames.

In another aspect, by sorting the TFCI decode vectors, it is possible to determine the most and least likely TFCI—this information can be used, for example, to determine whether or not DCCH is likely to exist, or whether FULL rate is likely to exist.

Lastly, for R99 spreading factor less than 128, there are 4 times more TFCI bits transmitted than in the higher spreading factors. The TFCI bits are typically transmitted with repetition such that the 32 bits are transmitted in sequence 3.75 times. Thus, in one aspect, it is possible to perform early decoding of TFCI after just part of the DPCH frame is received if SIRE is sufficiently high which would indicate that TFCI bits are generally of a high fidelity.

There are several applications where an early TFCI decode can be useful:

For example, in the context of WCDMA voice frame early termination, TFCI indicates whether or not a DPDCH channel exists for demodulation. If TFCI can be reliably decoded early in the DTCH TTI, then there is more potential power savings at the UE since UE can decode the data channel early with the proper TFCI decision, or reliably enter low power mode without requirement of decoding the data channel at all.

In another example, in the context of multiple Tx/Rx UEs, such as Dual-Sim Dual Active (DSDA) and variants (Dual-Sim Dual Standby (DSDS), TST (S/A), QSQ (S/A), etc., as well as single SIM with coexisting BT, WiFi, GPS, etc., where one active call may cause interference with another for example, early decoding of the TFCI within the DTCH TTI can allow for information about voice or data activity to be passed from one call to the other. For example if TFCI indicates no traffic, then a high level of interference can be allowed during this TTI so that other coexisting interfering Tx technologies can use the remaining slots of this TTI, and if TFCI indicates a control signaling message, then a lower level of interference can be tolerated in this TTI and other coexisting interfering Tx technologies must reduce or stop transmitting.

Yet in another example, in the context of WCDMA DCCH early detection, early TFCI decoding can be performed instead of waiting for 10 ms boundary to make a determination if this TTI contains DCCH information. This allows for a longer duration where UE can request for additional power from the network to improve DCCH decode reliability. For 10 ms TTI DCCH, this allows for some enhancement to DCCH TTI that is currently not covered by the original DCCH early detection enhancement.

Figure 2:
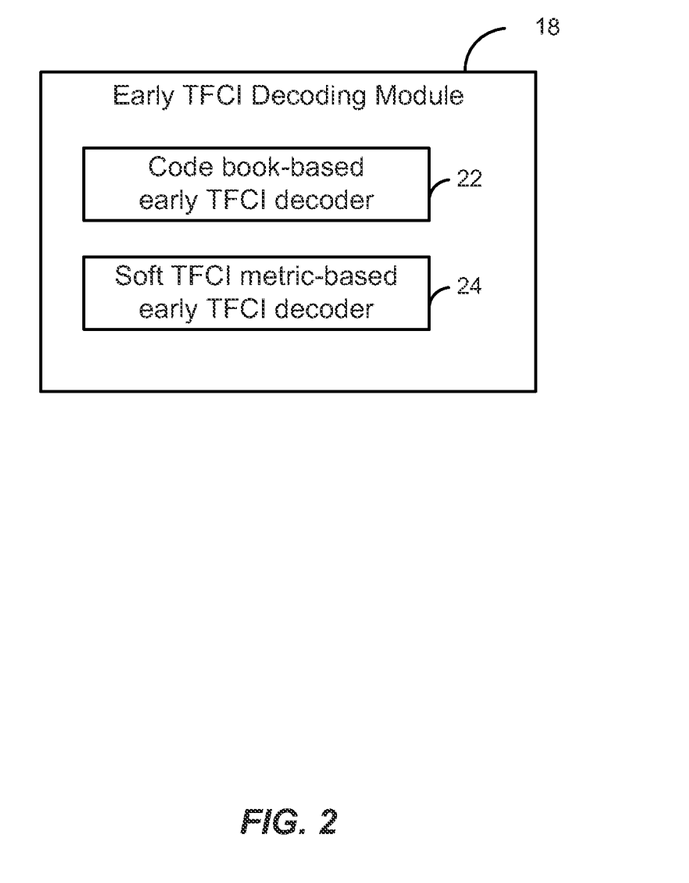
FIG. 2 illustrates one example implementation of an early TFCI decoding module of the WCDMA receiver.

FIG. 2 illustrate one example implementation of the early TFCI decode module of a WCDMA receiver. In one aspect, module 18 may be implemented as a software program stored in memory 15 and executed by the processor 14 (FIG. 1). The processor 14 may periodically, e.g., every 10 ms, 14 ms or 20 ms, activate the early decode module 18 to attempt early decoding of the encoded TFCI bit sequences. As shown, early TFCI decode module 18 may include one or more of the following sub-modules each of which configured to perform a different early decode algorithm: Sub-module 22 is configure to perform code book-based early TFCI decoding (see FIG. 3A); Sub-module 24 is configure to perform soft TFCI metric-based early TFCI decoding (see FIG. 3B).

Figure 3A:
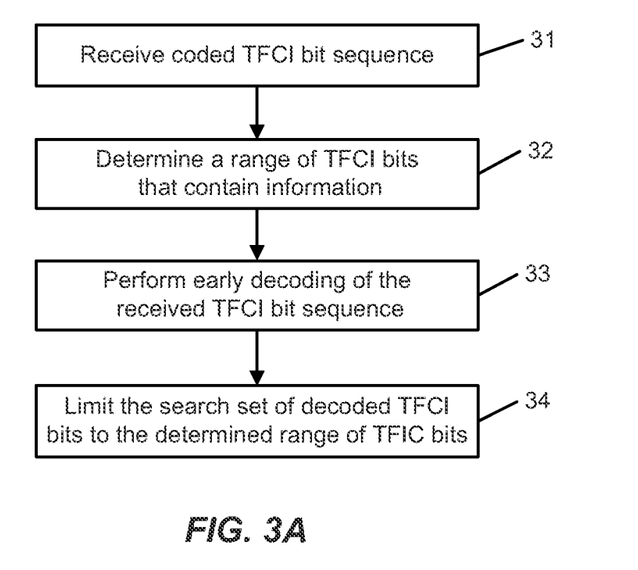
FIGS. 3A and 3B are example methodologies of early TFCI decoding according to different aspects.

FIG. 3A is an example method of the early TFCI decoding implemented by sub-module 22 (FIG. 2). At step 31, the method receives coded TFCI bit sequence on a DPCH or SCCPCH. At step 32, the method determines from the code book a range of TFCI bits that contain information. At step 33, the method performs early decoding of the received TFCI bit sequence. At step 34, the method limits the search set of decoded TFCI bits to the determined range of TFCI bits that contain information.

Figure 3B:
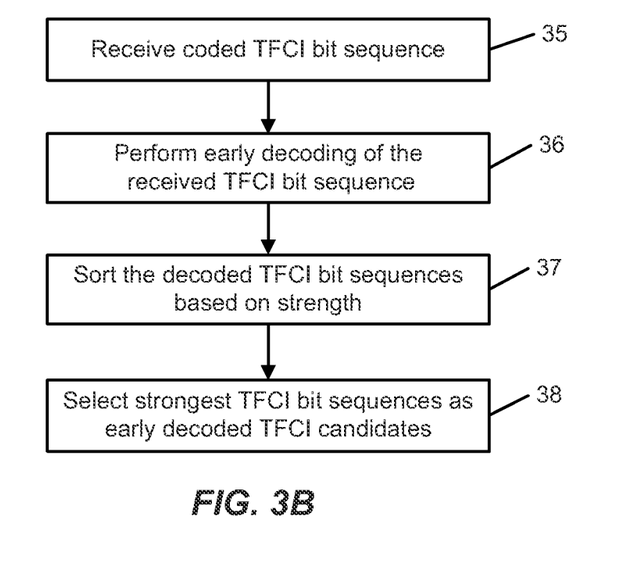

FIG. 3B is another example method of the early TFCI decoding implemented by sub-module 24 (FIG. 2). At step 35, the method receives coded TFCI bit sequence on a DPCH or SCCPCH. At step 36, the method performs early decoding of the received TFCI bit sequence. At step 37, the method sorts the decoded TFCI bit sequences based on strength of the decoded TFCI bit sequence. At step 38, the method select one or more strongest TFCI bit sequences as early decoded TFCI candidates.

Figure 4:
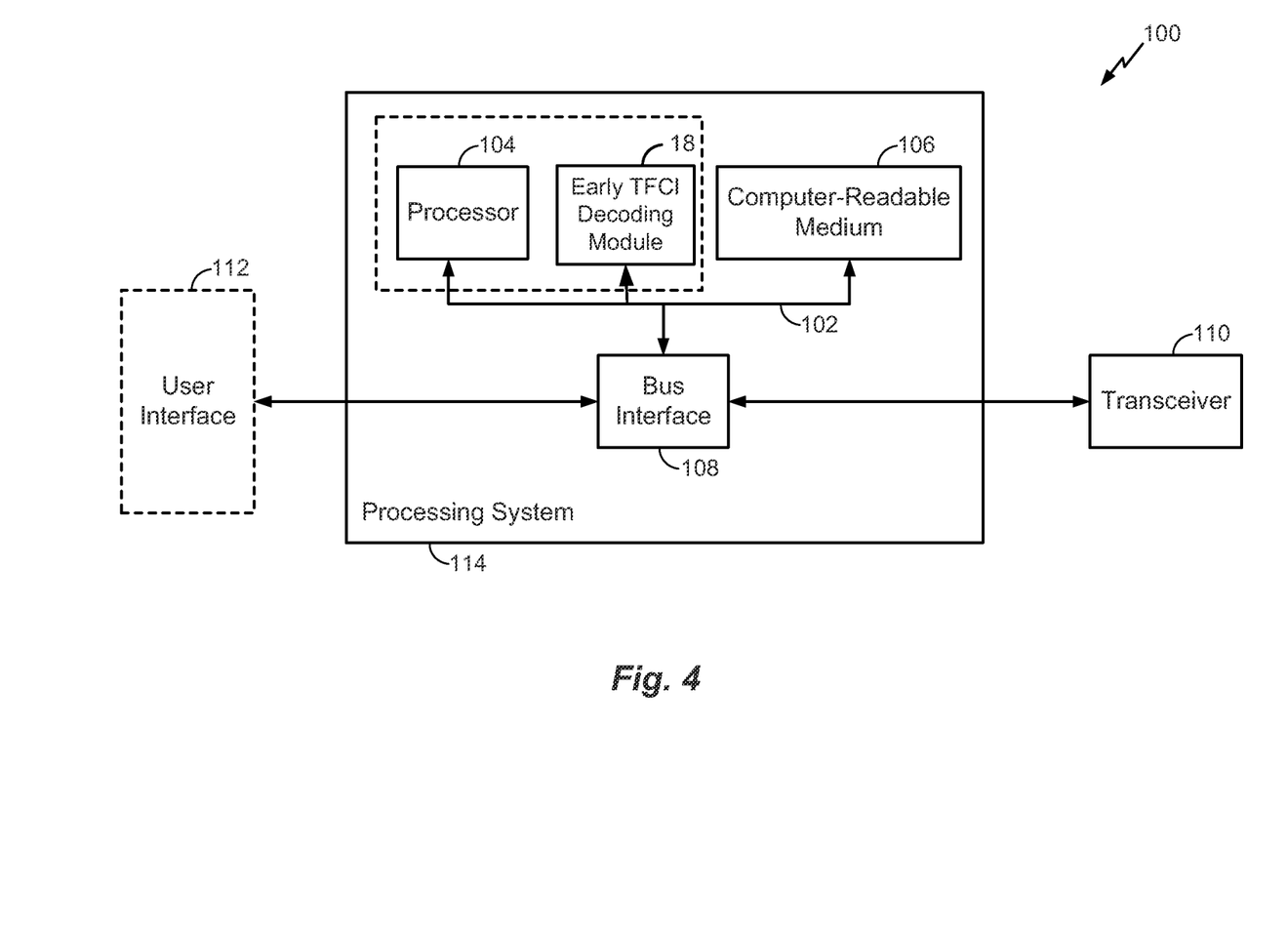
FIG. 4 is a block diagram illustrating an example of a hardware implementation for an apparatus employing a processing system.

FIG. 4 is a block diagram illustrating an example of a hardware implementation for an apparatus 100, such as a UE, employing a processing system 114, which may include the early TFCI decoding module 18 (FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. In one example aspect, the early TFCI decoding module 18 may be implemented as a software component executable by processor 104. The computer-readable medium 106 may also be used for storing data that is manipulated by the processor 104 when executing software.

Figure 5:
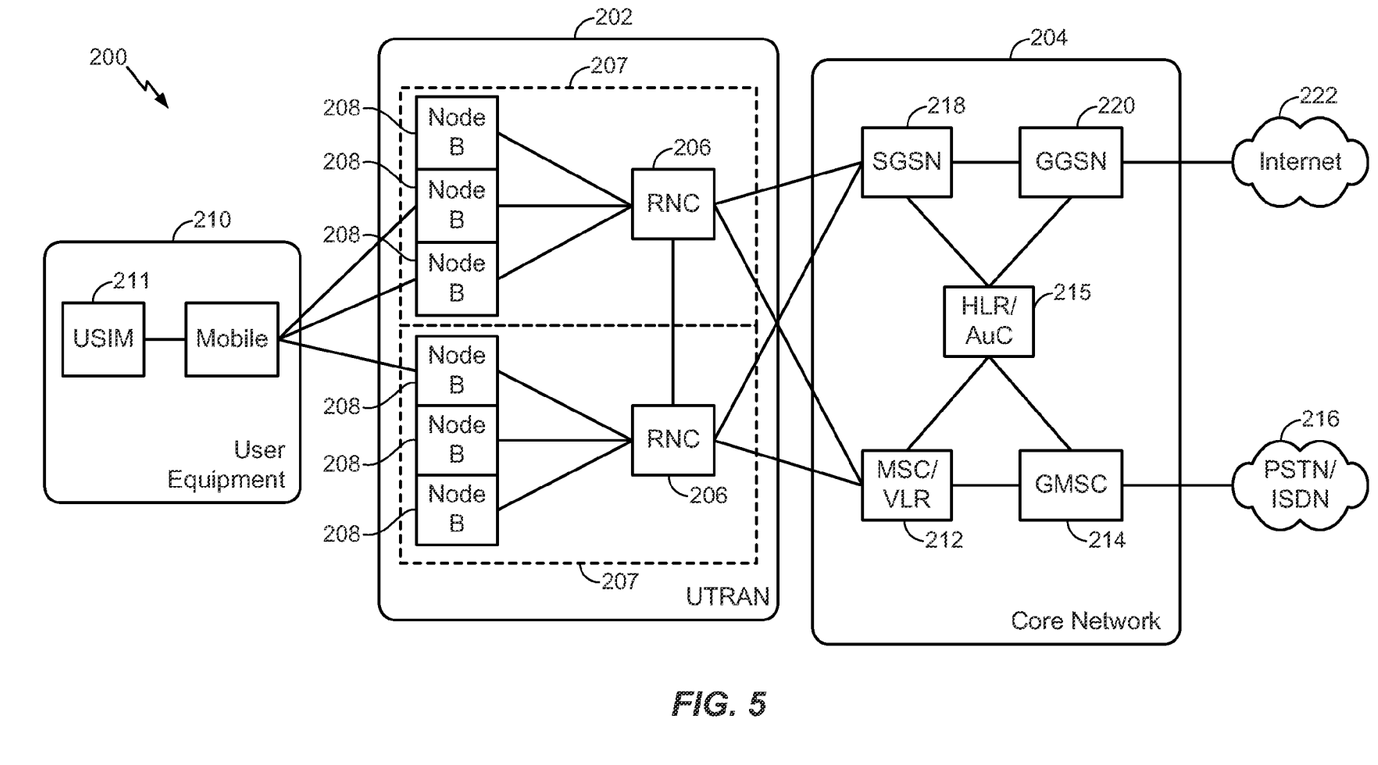
FIG. 5 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 5 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In one example aspect, the UE 210 may include an early TFCI decoding module 18 (FIG. 1). In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially preceded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
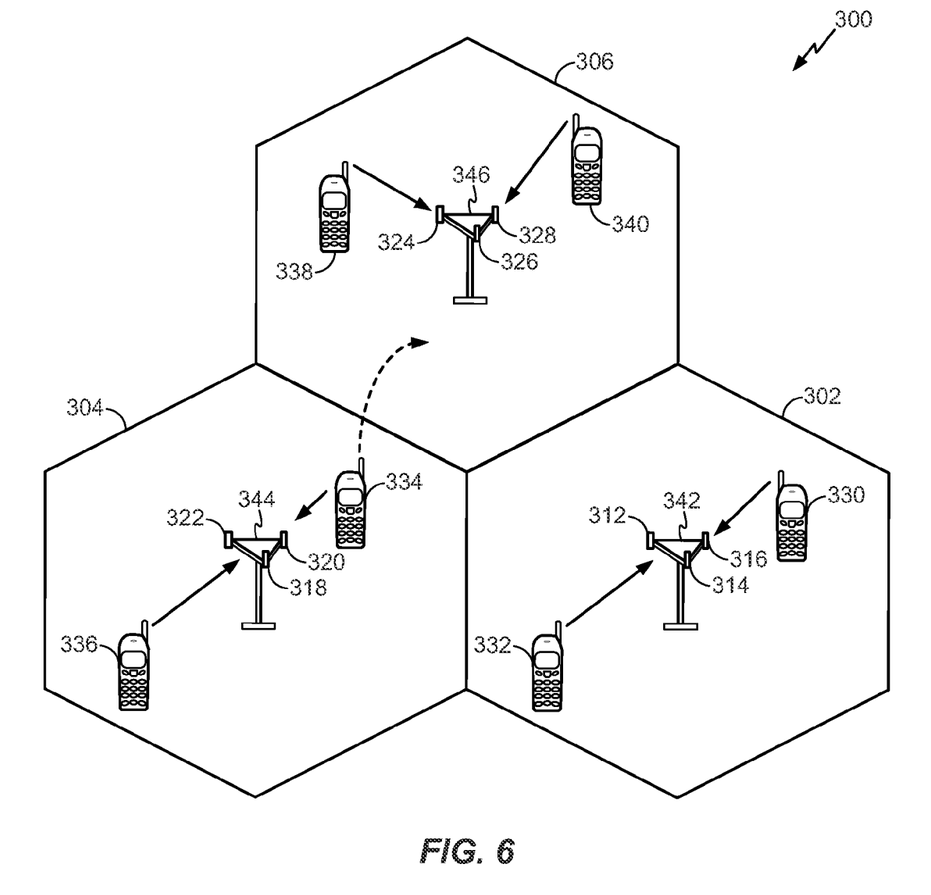
FIG. 6 is a conceptual diagram illustrating an example of an access network.

Referring to FIG. 6, an access network 300 in a UTRAN architecture is illustrated. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 5) for all the UEs 330, 332, 334, 336, 338, 340 in the respective cells 302, 304, and 306. In one example aspect, one or more of UEs 330, 332, 334, 336, 338, 340 may include the early TFCI decoding module 18 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 5), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
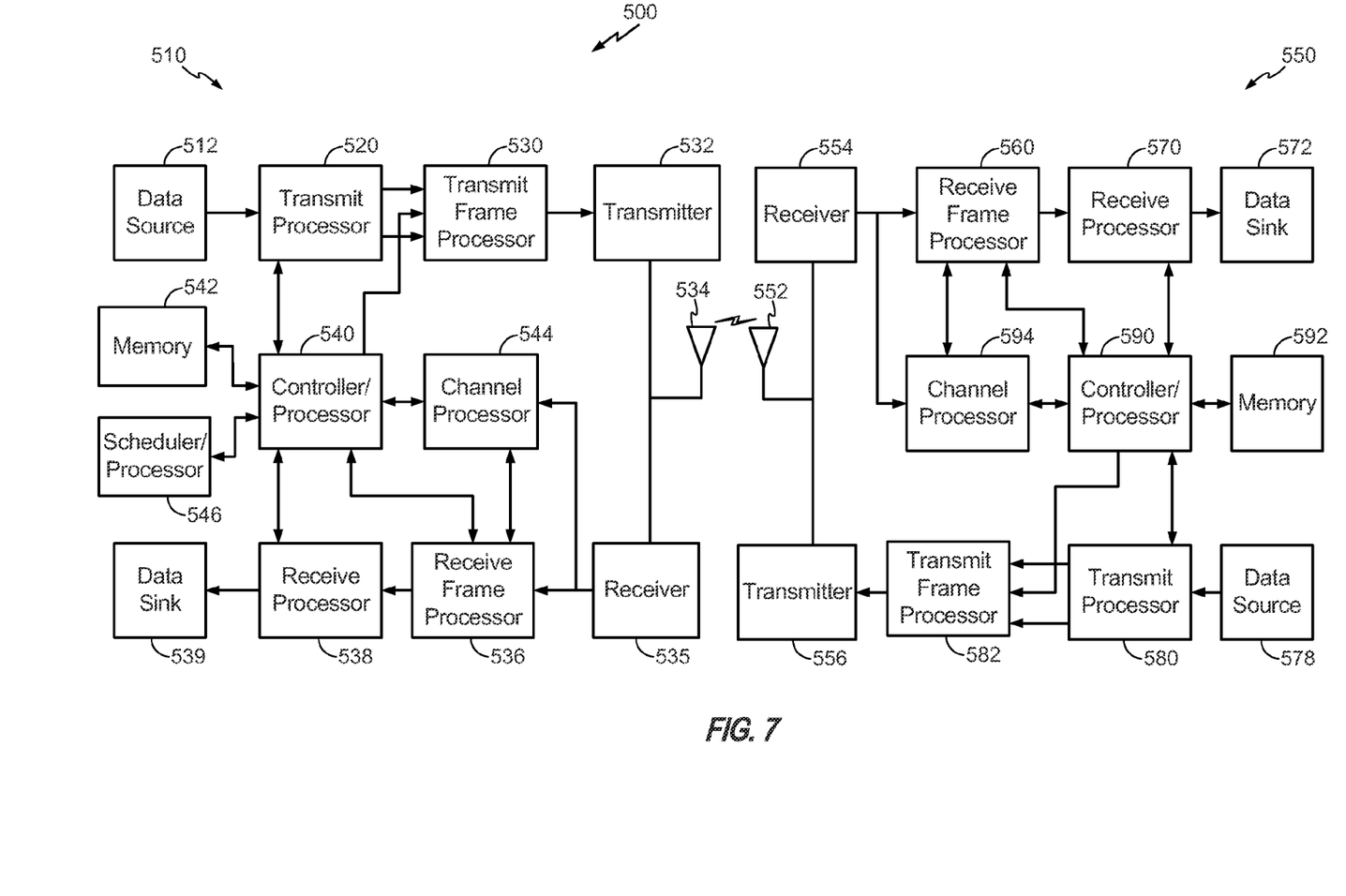
FIG. 7 is a block diagram conceptually illustrating an example of a Node B in communication with a UE in a telecommunications system.

FIG. 7 is a block diagram of a Node B 510 in communication with a UE 550, where the Node B 510 may be the Node B 208 in FIG. 5, and the UE 550 may be the UE 210 in FIG. 5. In one example aspect, the UE 550 may include an early TFCI decoding module 18 (FIG. 1). In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

As used herein, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for early decoding of transport format combination indicator (TFCI) in a universal mobile telecommunications system (UMTS), comprising:
    receiving a coded TFCI bit sequence on a physical channel;
    determining a range of TFCI bits that contain information;
    performing early decoding of the received TFCI bit sequence; and
    limiting a search set of decoded TFCI bits to the determined range of TFCI bits.

2. The method of claim 1, wherein the range of TFCI bits that contain information is determined from a code book.

3. The method of claim 1, wherein the range of TFCI bits that contain information is determined based on one of a communication protocol used on the physical channel, a data encoding scheme used on the physical channel, and call types including different numbers of transport channels.

4. The method of claim 1, wherein performing early decoding of the TFCI bit sequence includes performing Fast Hadamard Transform (FHT) on the coded TFCI bit sequence.

5. The method of claim 1, further comprising
    determining whether the TFCI bit sequence is correctly decoded; and
    when the TFCI bit sequence is correctly decoded, performing early decoding of the physical channel.

6. The method of claim 1, further comprising
    determining whether the TFCI bit sequence is correctly decoded; and
    when the TFCI bit sequence is correctly decoded, entering a low power mode by a user equipment without decoding the physical channel.

7. The method of claim 1, wherein the physical channel includes one of a dedicated physical channel (DPCH) and a Secondary Common Control Physical Channel (SCCPCH).

8. An apparatus for early decoding of transport format combination indicator (TFCI) in a universal mobile telecommunications system (UMTS), comprising:
    at least one processor configured to:
        receive coded TFCI bit sequence on a physical channel;
        determine a range of TFCI bits that contain information;
        perform early decoding of the received TFCI bit sequence; and
        limit a search set of decoded TFCI bits to the determined range of TFCI bits.

9. The apparatus of claim 8, wherein the range of TFCI bits that contain information is determined from a code book.

10. The apparatus of claim 8, wherein the range of TFCI bits that contain information is determined based on one of a communication protocol used on the physical channel, a data encoding scheme used on the physical channel, and call types including different numbers of transport channels.

11. The apparatus of claim 8, wherein to perform early decoding of the TFCI bit sequence, the at least one processor is further configured to perform Fast Hadamard Transform (FHT) on the coded TFCI bit sequence.

12. The apparatus of claim 8, wherein the at least one processor is further configured to:
   determine whether the TFCI bit sequence is correctly decoded; and
   when the TFCI bit sequence is correctly decoded, perform early decoding of the physical channel.

13. The apparatus of claim 8, wherein the at least one processor is further configured to:
   determine whether the TFCI bit sequence is correctly decoded; and
   when the TFCI bit sequence is correctly decoded, enter a low power mode without decoding the physical channel.

14. The apparatus of claim 8, wherein the physical channel includes one of a dedicated physical channel (DPCH) and a Secondary Common Control Physical Channel (SCCPCH).

15. A method for early decoding of transport format combination indicator (TFCI) in a universal mobile telecommunications system (UMTS), comprising:
   receiving coded TFCI bit sequence on a physical channel;
   performing early decoding of the received TFCI bit sequence;
   sorting the decoded TFCI bit sequences based on strength of the decoded TFCI bit sequence; and
   selecting one or more strongest TFCI bit sequences as early decoded TFCI candidates.

16. The method of claim 15, wherein performing early decoding of the TFCI bit sequence includes performing Fast Hadamard Transform (FHT) on the coded TFCI bit sequence.

17. The method of claim 15, further comprising
   determining whether the TFCI bit sequence is correctly decoded; and
   when the TFCI bit sequence is correctly decoded, performing early decoding of the physical channel.

18. The method of claim 15, further comprising
   determining whether the TFCI bit sequence is correctly decoded; and
   when the TFCI bit sequence is correctly decoded, entering a low power mode by a user equipment without decoding the physical channel.

19. The method of claim 15, wherein the physical channel includes one of a dedicated physical channel (DPCH) and a Secondary Common Control Physical Channel (SCCPCH).

20. An apparatus for early decoding of transport format combination indicator (TFCI) in a universal mobile telecommunications system (UMTS), comprising:
   at least one processor configured to:
      receive coded TFCI bit sequence on a physical channel;
      perform early decoding of the received TFCI bit sequence;
      sort the decoded TFCI bit sequences based on strength of the decoded TFCI bit sequence; and
      select one or more strongest TFCI bit sequences as early decoded TFCI candidates.

21. The apparatus of claim 20, wherein to perform early decoding of the TFCI bit sequence, the at least one processor is further configured to perform Fast Hadamard Transform (FHT) on the coded TFCI bit sequence.

22. The apparatus of claim 20, wherein the at least one processor is further configured to:
   determine whether the TFCI bit sequence is correctly decoded; and
   when the TFCI bit sequence is correctly decoded, perform early decoding of the physical channel.

23. The apparatus of claim 20, wherein the at least one processor is further configured to:
   determine whether the TFCI bit sequence is correctly decoded; and
   when the TFCI bit sequence is correctly decoded, enter a low power mode without decoding the physical channel.

24. The apparatus of claim 20, wherein the physical channel includes one of a dedicated physical channel (DPCH) and a Secondary Common Control Physical Channel (SCCPCH).

\* \* \* \* \*